United States Patent
Crickmore (10) Patent No.: US 12,411,026 B2
(45) Date of Patent: Sep. 9, 2025

(54) FIBRE OPTIC SENSING (71) Applicant: Optasense Holdings Limited, Farnborough (GB)

(72) Inventor: Roger Crickmore, Farnborough (GB)

(73) Assignee: Optasense Holdings Limited, Camberley (GB)

( * ) Notice: Subject to any disclaimer, the term of this patent is extended or adjusted under 35 U.S.C. 154(b) by 63 days.

(21) Appl. No.: 18/027,685

(22) PCT Filed: Dec. 14, 2021

(86) PCT No.: PCT/GB2021/053269
§ 371 (c)(1),
(2) Date: Mar. 22, 2023

(87) PCT Pub. No.: WO2022/136832
PCT Pub. Date: Jun. 30, 2022

(65) Prior Publication Data
US 2023/0375378 A1    Nov. 23, 2023

(30) Foreign Application Priority Data
Dec. 22, 2020 (GB) ...................... 2020409

(51) Int. Cl.
G01D 5/353 (2006.01)
H04B 10/079 (2013.01)

(52) U.S. Cl.
CPC ..... *G01D 5/35361* (2013.01); *H04B 10/0791* (2013.01)

(58) Field of Classification Search
CPC ................ H04B 10/0791; G01D 5/35361
See application file for complete search history.

(56) References Cited

U.S. PATENT DOCUMENTS

| | | | |
|---|---|---|---|
| 4,983,034 A | 1/1991 | Spillman, Jr. | |
| 2005/0078316 A1* | 4/2005 | Ronnekleiv | G01D 5/35312 356/478 |

(Continued)

FOREIGN PATENT DOCUMENTS

| | | |
|---|---|---|
| CN | 101639379 | 2/2010 |
| CN | 102147236 | 8/2011 |

(Continued)

OTHER PUBLICATIONS

Intellectual Property Office, Search Report mailed on Jun. 22, 2021, issued in connection with Application No. GB2020409.5, 5 pages.

(Continued)

*Primary Examiner* — Pranesh K Barua
(74) *Attorney, Agent, or Firm* — McDonnell Boehnen Hulbert & Berghoff LLP (57) ABSTRACT

This application relates to distributed fibre optic sensing. A sensor apparatus includes an interrogator for repeatedly interrogating a sensing optical fibre with interrogating optical radiation and detecting radiation which is Rayleigh backscattered from within the sensing fibre. In a first, polarisation sensing mode of operation, the interrogator is optically coupled to the sensing fibre via an optical system that includes a length of optical fibre upstream of a polariser and the interrogator is configured to output coherent optical radiation with an optical power such that the interrogating radiation experiences non-linear effects when propagating in the length of optical fibre, so as to reduce coherence of the interrogating radiation. In the first mode, the interrogator determines the extent of any variation in polarisation of the backscatter radiation. The apparatus may also be operable in a second, coherent sensing mode in which the interrogator outputs optical radiation below a non-linear threshold.

20 Claims, 2 Drawing Sheets (56) References Cited

U.S. PATENT DOCUMENTS

2010/0085558 A1\* 4/2010 Chen .................. G02B 6/02
                                                  356/73.1
2017/0199075 A1\* 7/2017 Lewis ................ G01D 5/35361

FOREIGN PATENT DOCUMENTS

| CN | 109282839 B | \* | 11/2020 | ............. G01D 5/344 |
| EP | 3680638 A1 | \* | 7/2020 | ......... G01D 5/35361 |
| GB | 1811640.0 | \* | 8/2018 | |
| JP | H08179386 | | 7/1996 | |
| JP | H08179386 A | \* | 7/1996 | |
| WO | 2016/147100 | | 9/2016 | |
| WO | 2020/016556 | | 1/2020 | |

OTHER PUBLICATIONS

International Searching Authority, International Search Report and Written Opinion mailed on Mar. 3, 2022, issued in connection with International Patent Application No. PCT/GB2021/053269, filed on Dec. 14, 2021, 18 pages.

Intellectual Property Office, Examination Report mailed Jun. 25, 2024, issued in connection with United Kindgom Patent Application No. GB2304220.3, 4 pages.

\* cited by examiner

FIBRE OPTIC SENSING

CROSS-REFERENCE TO RELATED APPLICATIONS

The present application is a national stage entry of PCT/GB2021/053269 filed Dec. 14, 2021, which claims priority to GB 2020409.5 filed on Dec. 22, 2020, the contents of each of which are hereby incorporated by reference.

FIELD OF THE DISCLOSURE

This application relates to methods and apparatus for fibre optic sensing.

BACKGROUND

Distributed fibre optic sensing is a known type of sensing where an optical fibre is deployed as a sensing fibre and interrogated with electromagnetic radiation to provide sensing of environmental stimuli affecting the sensing fibre along its length. By analysing the radiation backscattered from within the sensing fibre based on the round trip travel time to different distances into the sensing fibre, the sensing fibre can effectively be divided into a plurality of discrete sensing portions which may be (but do not have to be) contiguous.

One class of distributed fibre optic sensing is based on interrogating the sensing fibre with coherent optical radiation and detecting any of the interrogating radiation which has been Rayleigh backscattered from within the sensing fibre.

The sensing fibre may be repeatedly interrogated, and each interrogation may comprise launching coherent interrogating radiation into a first end of the sensing fibre and detecting the Rayleigh backscatter from that interrogation, i.e. radiation which has been elastically backscattered at the same frequency as the interrogating radiation. As the interrogating radiation propagates in the sensing fibre, it may be backscattered from various scattering sites within the optical fibre, which may be inherent scattering sites that are inherently present in the optical fibre, i.e. not deliberately introduced reflection sites. The backscatter arriving back at the first end of the sensing fibre at any time will include contributions of backscatter from various different scattering sites from a portion of fibre illuminated by the interrogating radiation. As the interrogating radiation is coherent, the backscatter from the different scattering sites will interfere to provide an overall interference signal, which depends on the distribution of the inherent scattering sites within the fibre.

Within each discrete sensing portion of the sensing fibre, disturbances of the fibre, for instance dynamic strains due to incident acoustic waves, can cause a variation in effective optical path length of that section, which results in a variation in the distribution of the scattering sites and hence a variation in the properties of the interference signal.

This variation can be detected and analysed and used to give an indication of disturbance of the fibre at that sensing portion. Such a fibre optic sensor effectively acts as a linear sensing array of sensing portions of optical fibre which are responsive to dynamic disturbances such as strains due to acoustic stimuli, and thus such sensing is often referred to as distributed acoustic sensing (DAS), although the same principles can be applied to detect any stimulus that results in a variation in effective optical path length of the sensing fibre, such as dynamic temperature variations.

Such coherent Rayleigh based distributed fibre optic sensing can be usefully employed in a range of different applications. Typically, coherent Rayleigh based distributed fibre optic sensing will be implemented using a coherent Rayleigh interrogator unit that may, in use, be connected to a sensing optical fibre and which is operable to output suitable coherent interrogating radiation into the sensing fibre and receive and analyse radiation which is backscattered therefrom.

SUMMARY

Embodiments of the present disclosure relate to methods and apparatus for fibre optic distributed acoustic sensing, that can provide additional or alternative sensing functionality.

Thus, according to an aspect there is provided a distributed fibre optic sensing apparatus, comprising:
 an interrogator for repeatedly interrogating a sensing optical fibre with interrogating optical radiation and detecting radiation which is Rayleigh backscattered from within the sensing fibre,
 wherein the sensing apparatus is operable in a first mode of operation, in which:
 the interrogator is optically coupled to the sensing fibre so that interrogating radiation output from the interrogator is transmitted to the sensing fibre via a first optical system that comprises a first length of optical fibre upstream of a first polariser;
 the interrogator is configured to output coherent optical radiation with an optical power such that the interrogating radiation experiences non-linear effects when propagating in the first length of optical fibre so as to reduce coherence of the interrogating radiation; and
 the interrogator is configured to determine the extent of any variation in polarisation of the radiation which is Rayleigh backscattered from within the sensing fibre.

In some examples, the optical power of the interrogating radiation in the first mode of operation and the length of the first length of optical fibre may be configured so that propagation of the interrogating radiation through the first length of optical fibre in the first mode results in the interrogating radiation being substantially incoherent.

In some examples the first optical system may further comprise a polarisation controller. The polarisation controller may be configured to selectively control a polarisation modulation applied, so as to maximise an amount of interrogating radiation that is transmitted via the polariser to the sensing optical fibre. In some implementations the interrogator may be configured to monitor the amount of interrogating radiation that is transmitted via the polariser to the sensing optical fibre based on the backscatter intensity received from the start of the sensing fibre.

In some examples, in the first mode of operation, the interrogator is optically coupled to the sensing fibre so that radiation which is Rayleigh backscattered from within the sensing fibre is returned to the interrogator via a return path polariser. The interrogator may be optically coupled to the sensing fibre so that radiation which is Rayleigh backscattered from within the sensing fibre is returned to the interrogator via the first optical system and the first polariser is the return path polariser. The interrogator may be configured to determine the extent of any variation in polarisation of the radiation which is Rayleigh backscattered based on the intensity of backscattered radiation passed by the return path polariser.

In some examples, the interrogator may comprise a polarisation mixer for mixing the backscattered radiation with a local oscillator to provide a mixed signal. The mixed signal may be split into two different orthogonal polarisation channels and the interrogator may be configured to determine the extent of any variation in polarisation of the radiation which is Rayleigh backscattered based on a comparison of the two polarisation channels. In the first mode of operation, the interrogator may be optically coupled to the sensing fibre so that radiation which is Rayleigh backscattered from within the sensing fibre is returned to the interrogator via a return path that bypasses the first optical system. In some examples the interrogator may comprise a polarisation analyser. In the first mode of operation, the polarisation analyser may be configured to analyse the backscattered radiation to determine full polarisation properties of the backscattered radiation.

In some implementations, in the first mode of operation, the distributed fibre optic sensing apparatus may be operable to generate a dynamic measurement signal for each of a plurality of sensing portions of the sensing optical fibre indicative of dynamic changes in polarisation over time. Additionally or alternatively, the distributed fibre optic sensing apparatus may be operable to generate a static measurement signal for indicative of changes in polarisation over the length of the sensing fibre.

In some examples, the sensing apparatus may be further operable in a second mode of operation, wherein in the second mode of operation the interrogator is configured to output coherent optical radiation with an optical power that is below a threshold for significant non-linear effects in an optical fibre. In the second mode of operation, the interrogator may be optically coupled to the sensing fibre so that interrogating radiation output from the interrogator is transmitted to the sensing fibre via the first optical system. Alternatively, in the second mode of operation, the interrogator may be optically coupled to the sensing fibre so that interrogating radiation output from the interrogator is transmitted to the sensing fibre via an optical path that bypasses the first optical system. The second mode of operation may be a distributed acoustic sensing mode of operation.

The sensing apparatus according may include the sensing optical fibre. In some examples the sensing optical fibre may comprise an optical fibre processed to provide enhanced backscatter.

In another aspect there is provided a method of distributed fibre optic sensing apparatus, comprising:
  operating an interrogator to repeatedly interrogate a sensing optical fibre with interrogating optical radiation and detecting radiation which is Rayleigh backscattered from within the sensing fibre,
  wherein the method comprises selectively operating in a first mode of operation, in which:
    the interrogator is optically coupled to the sensing fibre so that interrogating radiation output from the interrogator is transmitted to the sensing fibre via a first optical system that comprises a first length of optical fibre upstream of a first polariser;
    the interrogator outputs coherent optical radiation with an optical power such that the interrogating radiation experiences non-linear effects when propagating in the first length of optical fibre so as to reduce coherence of the interrogating radiation; and
    determining the extent of any variation in polarisation of the radiation which is Rayleigh backscattered from within the sensing fibre.

The method may be implemented by any of the embodiments of the apparatus described herein. The method may further comprise selectively operating in a second mode of operation in which the interrogator outputs coherent optical radiation with an optical power that is below a threshold for significant non-linear effects in an optical fibre.

In another aspect there is provide a distributed fibre optic sensing apparatus, comprising: a coherent Rayleigh interrogator, wherein the sensing apparatus is operable in a first mode of operation, in which interrogating radiation output from the interrogator is transmitted to a sensing fibre via a first optical system that comprises a first length of optical fibre upstream of a first polariser and the interrogator outputs coherent interrogating radiation output with an optical power such that the interrogating radiation experiences non-linear effects when propagating in the first length of optical fibre.

Another aspect relates to the use of coherent Rayleigh distributed fibre optic sensing interrogator to perform polarisation optical time domain reflectometry measurements of a sensing optical fibre.

Unless specifically excluded or inherently incompatible, any of the features of any of the embodiments described herein may be implemented together in combination with any one or more of the other described features.

BRIEF DESCRIPTION OF THE DRAWINGS

Embodiments, and feature of embodiments of the present disclosure, will now be described by way of example only with respect to the accompanying drawings, of which.

DETAILED DESCRIPTION

As noted above, coherent Rayleigh based distributed fibre optic sensing is a known technique for sensing for dynamic disturbances acting on a sensing fibre. Coherent Rayleigh based distributed fibre optic sensing can usefully be used in a variety of different applications.

Figure 1:
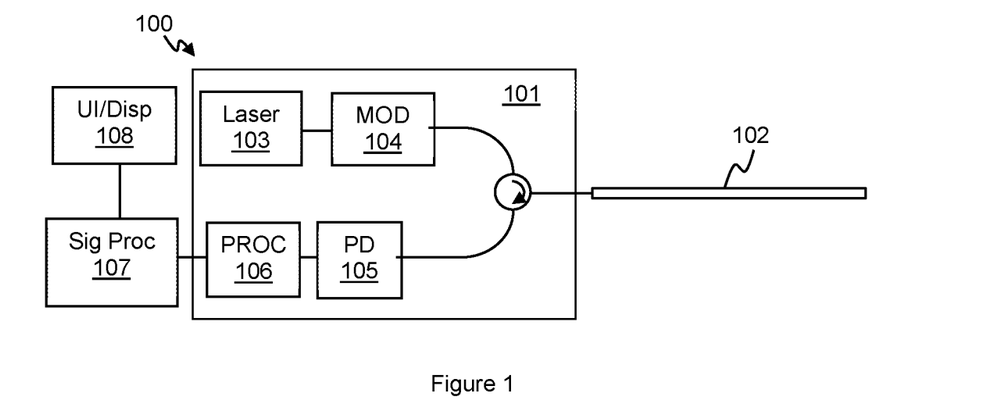
FIG. 1 illustrates an example of a typical distributed fibre optic sensor system for coherent Rayleigh sensing.

FIG. 1 shows a schematic of one example of a coherent Rayleigh distributed fibre optic sensing arrangement 100. An interrogator 101 is, in use, optically coupled to an optical fibre 102 which is to be used for sensing. The optical fibre 102, may be referred to herein as the sensing optical fibre or just sensing fibre (or sometimes as the fibre under test).

The sensing fibre 102 can be many kilometres in length and can, in some applications be tens of kilometres in length, say up to 40 km or more. For coherent Rayleigh distributed fibre optic sensing, the sensing fibre 102 may be a standard, unmodified single mode optic fibre such as is routinely used in telecommunications applications, without any specific modifications such as fibre Bragg gratings or the like that act as point sensors along the length of the fibre. The sensing fibre 102 may be deployed in an area of interest to be monitored and, in some cases, may be specifically deployed to allow for sensing. Depending on the particular use case, the sensing fibre may be deployed in a relatively permanent manner, e.g. being buried or otherwise secured in place. The interrogator 101 may be removably coupled to the sensing optical fibre 102, and thus in some instances, if continuous monitoring is not required, the interrogator 101 may be removed from the sensing fibre 102 when sensing is not required, possibly leaving the sensing fibre in situ. In some instances, use may be made of an existing optical fibre which is already deployed in the region of interest and which may have been originally deployed for some other performance, e.g. for communications. Note whilst the sensing fibre may be one continuous optical fibre, the sensing fibre could, in some applications, be formed from various optical fibre sections that have been spliced together or otherwise optically connected.

In use, the interrogator 101 repeatedly interrogates the sensing optical fibre 101 with coherent optical radiation and analyses the backscatter therefrom. The interrogator 101 thus comprises an optical source, in this example a laser 103, for generating coherent optical radiation and a modulator 104 for modulating the output of the laser. The modulator 104 modulates the output of the laser 103 so as to repeatedly interrogate the sensing fibre with optical radiation, which will be referred to herein as interrogating radiation, in a series of interrogations.

Note that as used herein the term "optical" is not restricted to the visible spectrum and, as used herein, the term optical refers to any electromagnetic radiation which may be guided by, and scattered from within, an optical fibre. For the avoidance of doubt, optical radiation as used herein includes infrared radiation and ultraviolet radiation. Any reference to "light" should also be construed accordingly.

The interrogating radiation may take different forms. In some examples a single pulse of optical radiation at a given launch frequency may be used for each interrogation, although in some embodiments each interrogation may comprise two (or more) pulses, in which case the optical pulses may have different frequencies from one another, e.g. a frequency pattern as described in GB2,442,745 or as described in WO2020/016556, or optical characteristics such as described in WO2012/137022, the contents of each of which are hereby incorporated by reference thereto. In some examples the interrogating radiation could comprise at least one pulse of optical radiation with a time varying frequency, e.g. a frequency swept or chirped pulse. In some examples the interrogating radiation may be amplitude and/or phase modulated, e.g. according to some code, for instance as described in US2019/0025094.

The modulator 104 thus modulates the optical radiation generated by laser 103 to provide suitable interrogating radiation. It will be understood that a single modulator 104 is illustrated in FIG. 1 for clarity, but in practice the modulator functionality could be implemented by multiple modulator components.

The phenomenon of Rayleigh backscattering results in some fraction of the interrogating radiation input into the sensing fibre being reflected back to the interrogator, where it is detected to provide an output signal which can be representative of environmental disturbances acting on the fibre. The interrogator 101 therefore comprises at least one photodetector 105 arranged to detect radiation which is Rayleigh backscattered from within the sensing fibre 102. In some embodiments the backscatter may be mixed with a local oscillator signal prior to detection.

For a coherent Rayleigh distributed fibre optic sensor, the backscatter from the sensing optical fibre 102 will depend on the distribution of inherent scattering sites within the optical fibre, which will vary effectively randomly along the length of the fibre. Thus the backscatter characteristics, e.g. intensity, from any given interrogation will exhibit a random variation from one sensing portion to the next but, in the absence of any environmental stimulus, the backscatter characteristics from any given sensing portion should remain the same for each repeated interrogation (provided the characteristics of the interrogating radiation, such as the optical frequency, amplitude and duration of the pulse or pulses, remains the same for each interrogation). However, an environmental stimulus acting on the relevant sensing portion of the fibre can result in an optical path length change for that section of fibre, e.g. through stretching/compression of the relevant section of fibre and/or a refractive index modulation. As the backscatter from the various scattering sites within the sensing portion of fibre will interfere to produce the resulting intensity, a change in optical path length will vary the degree of interference. The variation in distribution of the scattering sites will result in a variation in intensity of backscattered from an affected sensing portion, which can be detected and used as an indication of a disturbance acting on the fibre, such as an incident acoustic wave.

Additionally or alternatively, if each interrogation comprises spatially separated pulses at different frequencies to one another, or the backscatter is mixed with a local oscillator signal at a different frequency, the change in optical path length for a sensing portion with result in a change in phase of a carrier signal at the difference frequency, which can be detected and used as an indication of the disturbance.

The signal from the photodetector may thus be processed by processor 106 of the interrogator 101 to provide a measurement signal which is representative of disturbances acting on the sensing portions or channels of the fibre. The processor 106 may, in some implementations, process the detected backscatter for example as described in any of GB2,442,745, WO2012/137021, WO2012/137022 or WO2020/016556, depending on the form of the interrogating radiation. In some implementations the processing may determine a phase value from the backscattered light, e.g. the phase of a signal component at a defined carrier frequency. As described previously any changes in the effective optical path length within a given section of fibre, such as would be due to incident pressure waves causing strain on the fibre, can therefore be detected.

If the interrogation comprises a frequency swept or chirped pulse, the detected backscatter may be processed by using matched filtering or cross correlation so as to identify backscatter from different sensing portions of the sensing fibre, which may then be processed so as to determine any disturbances acting on that portion of the sensing fibre. Likewise, if the interrogation includes any coding, the received signal may be correlated with the known code, for example as described in US2019/0025094.

The form of the optical input and the method of detection and processing allows the sensing fibre, which may be a single continuous optical fibre, to be spatially resolved into discrete longitudinal sensing portions. That is, a measurement signal indicative of disturbance at one sensing portion, e.g. indicative of an incident acoustic wave, can be provided substantially independently of a measurement signal for another sensing portion. Note that the term acoustic, as used herein, shall be taken to mean any type of pressure wave or mechanical disturbance or varying strain generated on the optical fibre and will, for instance, include seismic waves or the like. The term acoustic is intended to refer to the type of stimulus acting on the sensing fibre but is not used to imply any particular frequency limitation.

As mentioned above, Rayleigh based distributed acoustic sensing can be performed satisfactorily on a standard, unmodified optical fibre, such as could be used for communications. In some implementations, however, where the optical fibre is specifically deployed for sensing, e.g. for DAS, the optical fibre may be selected to be an optical fibre that provides a relatively high degree of Rayleigh backscatter, i.e. elastic backscatter. Such an optical fibre, which may be referred to as a high backscatter or enhanced backscatter optical fibre, may be manufactured and/or processed in a way so as to increase the amount of Rayleigh backscatter therefrom. In some examples, the production process for an enhanced backscatter optical fibre may result in the formation of structures in the optical fibre that provide enhanced or additional elastic scattering, e.g. in addition to the inherent or native Rayleigh scattering that occurs. For the avoidance of doubt, such enhanced scattering optical fibres may be used in embodiments of the present disclosure and, as used herein, the term Rayleigh scattering will include all the elastic scattering from such an enhanced scattering optical fibre. In any case such a sensor may be seen as a fully distributed sensor, as it uses scattering process that are distributed throughout the optical fibre and thus distributes the sensing function throughout the optical fibre. It will be appreciated that this sensing is different to the use of FBG point sensors at different part of the fibre, where the wavelength of radiation reflected from the grating varies with spacing of the grating and is detected to detect disturbances acting on a grating.

The measurement signals from interrogator 101 may, in some implementations, be passed to a signal processor 107, which may be co-located with the interrogator 101 or may be remote therefrom. Optionally there may also be a user interface/graphical display 108, which may be co-located with the signal processor or may be remote therefrom. The signal processor 107 and user interface/graphical display 108 may be realised by an appropriately specified computing device such as a PC. The signal processor 107 may be configured to process the measurement signals to provide some sensing or monitoring functionality depending on the application that the sensor is being used for.

Whilst, in general, the processor 106 of the interrogator unit may be operable to generate measurement signals from the sensing portions of the sensing fibre and the signal processor 107 may be operable to apply any application specific processing to the measurement signals, in at least some implementations at least some of the processing to generate the measurement signals could be performed by signal processor 107 or at least some processing of the measurement signals could be performed by processed 106.

Such coherent Rayleigh distributed fibre optic sensors, e.g. DAS sensors, can be usefully employed in a range of applications to provide information about environmental disturbances acting on the sensing fibre for each of a plurality sensing portions. This can be used, for example, to detect the occurrence of events of interest and/or to allow some characterisation or analysis of the event.

Embodiments of the present disclosure relate to methods and systems for distributed fibre optic sensing that may be selectively operable to provide additional or alternative sensing functionality using a coherent Rayleigh distributed fibre sensing apparatus, in particular to enabling polarisation optical time domain reflectometry (POTDR) type measurements.

Optical time domain reflectometry (OTDR) is a known technique that can be used to characterise or monitor an optical path formed from one or more optical fibres. OTDR involves transmitting optical radiation into the optical fibre under test and monitoring the reflection/backscatter from the fibre. The backscatter from different distances into the fibre can be analysed separately, based on the round trip travel time to that part of the fibre, to provide information about the characteristics of the optical fibre and/or to monitor for any significant changes. Polarisation (or polarimetric) optical time domain reflectometry (POTDR) is a variant of OTDR that measures variation in the polarisation of the backscattered light. POTDR can, for example, be used to measure or monitor various characteristics of the optical fibre that impact on polarisation.

Having the ability to perform POTDR type measurements can be advantageous. Changes in the polarisation of the backscattered light are caused by certain deformations of the fibre such as bending or twisting, which result in a change of the birefringence of the fibre. However, a linear strain applied to the fibre does not result in a significant variation in polarisation of the backscatter. Thus, measurements of how polarisation of the backscatter varies along the length of the sensing fibre can usefully provide information about the arrangement of the sensing fibre, and in particular the extent of any twisting or bending of the fibre.

As noted above, in some instances distributed acoustic sensing may be employed making use of an existing optical fibre already deployed in an area of interest. It may therefore be useful to determine characteristics of the optical fibre, including polarisation characteristics, for example as part of determining how the optical fibre is deployed or arranged, e.g. the extent of bending etc. Performing periodic POTDR measurements can allow any changes in the fibre arrangement to be detected and/or monitored. POTDR measurements can, for instance, show up regions where, for example, a bend has formed in the fibre, and if such measurements were made on a regular basis it could show sections where the bend was increasing. Such bending could arise in a number of ways and may be detrimental to the sensing fibre and/or an asset being monitored by the sensing fibre. For instance, the sensing optical fibre could be part of a submarine cable structure, e.g. for communication or power transmission, and the submarine cable may, in some regions be free to move with water currents. Excessive bending itself may be damaging and/or could indicate that the cable structure is deforming around a feature on the seabed. Buried cables may be disturbed by subsidence, growth of tree roots or nearby building/excavation work. Being able to detect regions of increasing bend or twisting could enable preventative action to be taken before the sensing fibre and/or monitored asset become damaged.

Additionally or alternatively, performing POTDR measurements in addition to performing coherent Rayleigh backscatter measurements means that additional information can be gained about what is causing the signal, as bending/twisting can be distinguished from linear strains.

However, performing such POTDR measurements relies on interrogating the optical fibre with incoherent radiation, so as to avoid any unwanted interference effects. Were the sensing fibre interrogated with coherent optical radiation, any changes in polarisation could not be distinguished from strain in the sensing fibre. Conversely, as discussed above, coherent Rayleigh based distributed fibre optic sensing, such as DAS, uses interferometric techniques and hence requires coherent interrogating radiation.

Conventionally therefore one would consider that a dedicated POTDR interrogator would be required to perform POTDR measurements and a separate coherent Rayleigh interrogator, e.g. a DAS interrogator, would be required if it were wished to perform coherent Rayleigh distributed fibre optic sensing.

Embodiments of the present disclosure allow a coherent Rayleigh interrogator, e.g. a DAS interrogator, to be used to provide POTDR measurements.

Figure 2:
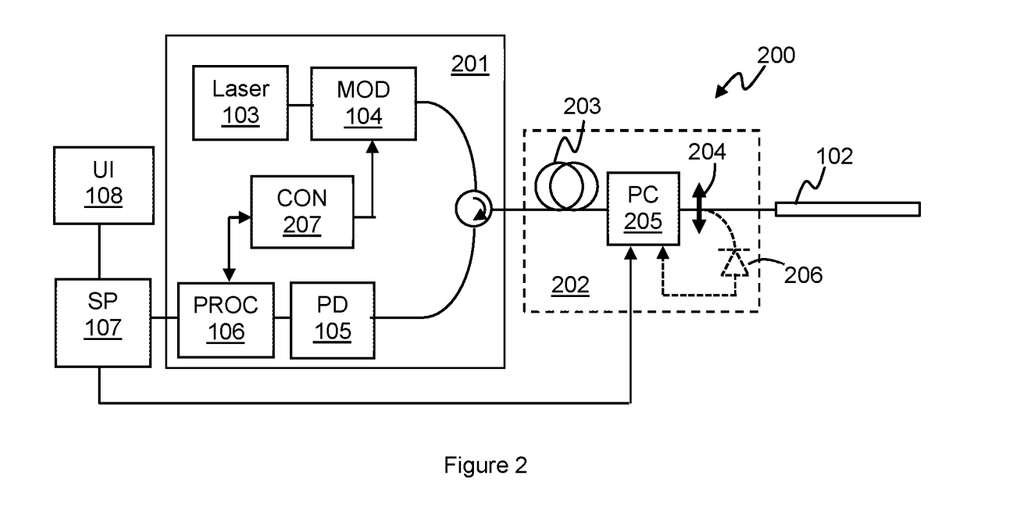
FIG. 2 illustrates a distributed fibre optic sensor system operable in a polarisation sensing mode according to an embodiment.

FIG. 2 illustrates a sensing arrangement 200 according to an embodiment in which similar components to those discussed with respect to FIG. 1 are identified with the same reference numerals. The sensing arrangement comprises an interrogator 201 for repeatedly interrogating a sensing optical fibre with interrogating optical radiation and detecting radiation which is Rayleigh backscattered from within the sensing fibre. The sensing arrangement comprises an interrogator 201 is suitable for coherent Rayleigh distributed fibre optic sensing and may be operable in generally the same manner as interrogator 101 discussed with reference to FIG. 1. The interrogator 201 may thus comprise an optical source, such as a laser 103, for generating coherent optical radiation, and a modulator 104 for modulating the coherent radiation to provide coherent interrogating radiation.

In the example of FIG. 2, however the interrogator 201 is arranged to be operable to output interrogating light to the sensing optical fibre 102 via an optical system 202 that comprises a first length 203 of optical fibre upstream of a polariser 204. In use, the interrogator 201 is operable, in one mode of operation, which will be referred to herein as a polarisation sensing mode, to generate the interrogating optical radiation with an optical power which is sufficiently high so that the interrogating optical radiation experiences non-linear effects when propagating in the first length 203 of optical fibre.

As one skilled in the art will be familiar, if optical radiation is launched into an optical fibre with sufficient power, this can lead to non-linear effects within the optical fibre, for instance the Kerr effect and self-phase modulation. These effects reduce the coherence of the propagating radiation.

For conventional coherent Rayleigh backscatter based distributed fibre optic sensing, such non-linear effects are undesirable and are generally detrimental. Thus, conventionally, the maximum power for the interrogating radiation is limited by a threshold for the onset of significant non-linear effects. Thus, for coherent Rayleigh distributed fibre optic sensing, modulator 104 will generally control the optical power of the interrogating radiation to be below such a non-linear threshold, below which significant non-linear effects are not expected.

In the embodiment of FIG. 2, however, the interrogator is operable, in the polarisation sensing mode of operation, to launch interrogating optical radiation with an optical power sufficiently high that significant non-linear effects are expected in the first length 203 of optical fibre. The first length 203 of optical fibre is chosen to have a length which is sufficiently long such that, due to such non-linear effects, propagation of such relatively high-power interrogating radiation through the first length 203 of optical fibre substantially destroys the coherence of the interrogating radiation. Thus, the interrogating radiation launched in the polarisation sensing mode, after passing through the first length 203 of optical radiation, is substantially incoherent, such that the backscatter from the sensing fibre 102 will not comprise any significant coherent interference component.

The first length 203 of optical fibre may, in some embodiments be several kilometres or tens of kilometres in length. For example, the first length 203 of optical fibre may be at least 10 km in length, or in some case at least 15 km or at least 20 km in length. In one example, a first length 203 of optical fibre of around 20 km in length may be used to render the interrogating substantially incoherent, when launched with an optical power above a non-linear threshold for the first length of optical fibre. The first length of optical fibre may be any suitable optical fibre and may, in some examples, be conventional single mode optical fibre. The first length 203 of optical fibre may be coupled between the interrogator 201 and the sensing fibre 102 in any convenient way and may, for instance, be deployed as a spool of optical fibre which is co-located with the interrogator 201.

The polariser 204 is located downstream (for outgoing interrogating radiation) of the first length 203 of optical fibre. In the polarisation sensing mode, the polariser 204 polarises the substantially incoherent interrogating radiation prior to it entering the sensing fibre 102. This ensures that the incoherent interrogating radiation which is input to the sensing fibre 102 has a defined polarisation. Within the sensing fibre 102, any deformation or disturbance of the sensing fibre which results in a change of polarisation will therefore result in a change in the polarisation of the backscatter from that point on, which can be detected.

In at least some embodiments, a polarisation controller 205 may be included as part of the optical system 202, upstream of the polariser 204, to ensure that at least some of the interrogating radiation is transmitted by the polariser 204 and enters the sensing fibre. Propagation of the interrogating radiation through the first length 203 of optical fibre may result in a polarisation modulation which may be unknown or undefined in advance. Thus it could be the case that, in some instances, the orientation of the polariser 204 would otherwise act to block a substantial portion of the interrogating radiation from the entering the sensing fibre 203, with a consequent impact in sensitivity. The polarisation controller 205 may thus be controlled so as to apply a selectively variable polarisation modulation so as to prevent such an occurrence and ensure that at least some of the interrogating radiation will pass through the polariser 204. The polarisation controller 205 may be controlled to generally maximise the amount of interrogating radiation which is transmitted by the polariser 204. In some examples the amount of interrogating radiation that is transmitted by polariser 204 may be determined by analysing the backscatter from downstream of the polariser 204, e.g. from the very start of the sensing fibre. The polarisation controller 205 could therefore be responsive to the output of the interrogator 201 to maximise the intensity from the start of the sensing fibre, e.g. under the control of the signal processor 107 as illustrated. However, it will be appreciated that other arrangements are possible and in some examples, a detector 206 could be arranged to monitor the amount of interrogating radiation at a point downstream of the polariser 204. Note that FIG. 2 illustrates that the polarisation controller 205 is located downstream of the first length 203 of optical fibre so as to apply a modulation to the interrogating radiation after transmission therethrough. In some embodiments, however, the polarisation controller 205 could be located upstream of the first length 203 of optical fibre so as to apply a pre-modulation. In either case the polarisation controller 205 ensures that a significant amount of the interrogating radiation is transmitted into the sensing fibre with a defined polarisation, so that any variation in polarisation of the backscattered can be determined.

There are various ways in which any variation in polarisation of the backscatter from the sensing fibre 102 can be detected. For example any variation in polarisation can be detected by passing the backscatter back through a return path polariser on the way back to the interrogator 201. As illustrated in FIG. 2 the interrogator 201 may be optically coupled to the sensing fibre so that interrogating radiation is transmitted from the interrogator to the sensing fibre and backscatter returned to the interrogator, via optical system 202 so that the polariser 204 also acts as the return path polariser. Any backscatter from within the sensing fibre 102 will only pass back through the polariser if has the correct polarisation. The level of backscatter from the very start of the sensing fibre 102 can be used to set a baseline. Within the sensing fibre 102, any deformation or disturbance of the sensing fibre which results in a change of polarisation will therefore result in a change in the amount of backscatter that returns through the polariser 204 for that sensing portion and subsequent sensing portions of the sensing fibre.

Backscatter from within the sensing fibre 102 which is of the correct polarisation may thus pass back through the polariser 204 and travel back to the interrogator 201, in this case, back via the first length 203 of optical fibre. Whilst there may be some slight propagation loss in the first length 203 of optical fibre, in general the intensity of backscatter received back at the interrogator 201 will depend on the amount of backscatter that is passed back through polariser 204. Hence the extent of any variation in polarisation of the radiation which is Rayleigh backscattered can be determined based on the intensity of backscattered radiation passed by the return path polariser.

The photodetector 105 can thus detect the intensity of the backscattered light, and the processor 106 can provide an indication of the variation in intensity in different sensing portions of the sensing portion according to known POTDR principles, in which case the round trip travel time to and from the sensing fibre 102 via the first length 203 of optical fibre is taken into account in defining the sensing portions of the sensing fibre. In embodiments where interrogator 201 operates to mix the backscatter with a local oscillator prior to detection, the processor can look for a variation in the intensity of the carrier signal.

In the polarisation sensing mode, the interrogator may be operable to acquire dynamic measurements of any variation in polarisation from one or more of sensing portions over time. In this case the interrogator 201 may be operable to repeatedly interrogate the sensing fibre 201. Each interrogation may comprise launching a single continuous pulse of interrogating radiation. The detected backscatter from the sensing portions of the sensing fibre 102 can be analysed to determine any variations over time which may be due to dynamic stimuli acting on the sensing fibre.

Additionally or alternatively, in the polarisation sensing mode, the interrogator may be operable to acquire static measurements of how polarisation varies along the length of the sensing fibre. Such static measurements can be made be looking at the average power of the backscatter received which over a period of time, and how it varies along the length of the sensing fibre. If the sensing fibre is generally static, then over any generally straight sections of the sensing fibre, it would be expected that the polarisation of the backscatter, and hence the amount of backscatter that is returned through polariser 204, would vary only relatively gradually along the length of the sensing fibre and any variation in polarisation may only occur over several tens of metres or more, e.g. over a length of 50 m or more. However, any sharp twist or bend of the sensing fibre would be expected to result in a much more significant change in polarisation over a relatively short distance, and hence a much more sudden change in the amount of backscatter than is passed by the polariser 204. Thus, by averaging the power of the backscatter over time, to average any dynamic effects, any locations of high bend/twist of the sensing fibre may be identified through areas where there is a sudden change in the power of the backscatter received along the length of the sensing fibre.

The sensing arrangement 200 described with respect to FIG. 2 is thus able to use a coherent Rayleigh interrogator 201 to perform POTDR measurements, when operating in a POTDR mode.

The sensing arrangement 200 may also be operable, in another mode, which will be referred to herein as a coherent sensing mode, to perform coherent Rayleigh distributed fibre sensing, e.g. DAS sensing.

In the coherent sensing mode, the interrogator 201 is operable to launch interrogating radiation with a launch optical power that is below the threshold at which significant non-linear effects are expected in the first length 203 of optical fibre (and the sensing fibre 102). In the coherent sensing mode, the modulator 104 of the interrogator may thus modulate the output of the laser 103 to provide interrogating radiation with an optical power which is not expected to result in any significant non-linear effects when propagating in an optical fibre, i.e. with an optical power that is below a threshold for significant non-linear effects in an optical fibre. Limiting the launch optical power in this way is conventional for coherent Rayleigh based distributed sensing, as described above.

The coherent interrogating radiation output from the interrogator 201 may thus propagate through the first length 203 of optical fibre without significant non-linear effects and thus may substantially maintain coherence. As discussed above, coherent Rayleigh based distributed fibre optic sensing has conventionally been performed on sensing fibres of lengths of several tens of kilometres, e.g. on sensing fibres of lengths of 40 km or 50 km or more, and thus the interrogating radiation about passing through a first length of optical fibre of the order of 20 km or so would be quite suitable for interrogating an optical fibre of a length of up to 20 km or 30 km or more.

The polarisation controller 205, if present, may operate in a similar manner as described above to maximise the amount of interrogating radiation passing through polariser 204.

In the coherent sensing mode the sensing fibre 102 is thus interrogated with coherent optical radiation and hence the backscatter from the sensing fibre 102 will be coherent.

Hence the backscatter from the sensing fibre 102 will contain a backscatter component which arises from interference between backscatter from different scattering sites within the sensing fibre 102 and which thus is response to changes in optical path length of a sensing portion.

In the example of FIG. 2, where the backscatter from the sensing fibre 102 is returned to the interrogator 204 via the polariser 204, the presence of the polariser 204 may block some of the backscatter from reaching the interrogator 201 and the received backscatter will include an intensity modulation due to any polarisation modulation imparted by the sensing fibre. However, the processing of the backscatter for coherent Rayleigh based distributed fibre optic sensing will generally not be affected by any polarisation modulation due to the static arrangement of the optical fibre. As noted above the random distribution of the scattering sites already means that there is a random nature to the intensity of backscatter from different sensing portions from any given interrogation and thus any polarisation based modulation due to the static arrangement of the sensing fibre can be seen as an additional random factor. For a Rayleigh based sensor that determines a measurement signal based on intensity variations, then any dynamic polarisation modulation may appear as a signal component, but any dynamic deformations of the fibre that induce a polarisation modulation would also be expected to induce a strain modulation and thus would be detected in any case.

The sensing arrangement 200 thus allows the interrogator 201 to selectively operate in either of a first polarisation sensing mode and a second coherent sensing mode, simply by changing the launch power of the interrogating radiation launched from the interrogator. The interrogator 201 may thus comprise a controller 207 for controlling the optical power of the output, e.g. for controlling the modulator 104.

The controller 207 may also control the form of the interrogating radiation in the different modes. For instance in the polarisation sensing mode, the controller 207 may control the interrogator 201 to output a single continuous pulse, at a given launch frequency, with a high optical power. A single, continuous pulse is sufficient for the polarisation sensing mode where it is the intensity of the received backscatter that it of interest and a single continuous pulse allows for relatively straightforward processing to provide measurements with a good SNR (signal-to-noise ratio). In the coherent sensing mode, the controller controls the interrogator 201 to output interrogating radiation of a lower optical power, and may control the modulator to generate output interrogating radiation of any desired form. In some instances the output interrogating radiation in the coherent sensing mode may also comprise a single continuous pulse at a given launch, but in some embodiments the interrogating radiation in the coherent sensing mode may comprise two or more pulses which may have a frequency difference and/or the interrogating radiation could be coded in some way as discussed above. The extent of any processing applied by the processor 207 may also be controlled based on the mode of operation and the form of the interrogating radiation.

A conventional coherent Rayleigh interrogator may generally be operable to provide a variable launch optical power and generally may be operable to output different forms of interrogating radiation so a suitable controller 207 may already be present in at least some coherent Rayleigh interrogators. In use the mode of operation may be controlled by the user, for instance via the user interface 108.

In the embodiment of FIG. 2, the interrogating radiation is transmitted to, and the backscatter received from, the sensing fibre via the optical system 202 including the first length 203 of optical fibre and the polariser 204 in both the polarisation sensing mode and the coherent sensing mode. Therefore, the modulator may swap between the polarisation sensing mode and the coherent sensing mode simply by controlling the interrogating radiation which is output. This would allow polarisation modes measurements to be acquired periodically whilst generally performing coherent Rayleigh sensing with some of the interrogations that, would otherwise be used for coherent Rayleigh sensing, being used for POTDR measurements.

In some cases, a coherent Rayleigh interrogator may include wavelength division functionality to allow a sensing fibre to be interrogated with different series interrogations at different optical wavelengths. It will be understood that the sensing techniques rely on being able to identify the backscatter associated with a given sensing portion. This may thus involve launching an interrogation comprising one or more pulses of optical radiation and allowing time for the optical radiation to travel to the end of the sensing fibre and back before launching the next interrogation, so that the backscatter from the relevant part of the sensing fibre can be uniquely identified by time of arrival. Alternatively, each interrogation could comprise interrogation which is coded in some way to allow the relevant backscatter from a section of fibre to be discriminated by correlation. Again, however, the time between successive interrogations (using the same code) should be at least as long as the round trip travel time to the end of the sensing fibre and back. This travel time to the end of the sensing fibre and back (or at least to a distance beyond which no significant backscatter is expected) sets the ping range, i.e. the rate at which the sensing fibre can be interrogated. It has been proposed that wavelength division technique could be used to allow different interrogations at different wavelength, with the backscatter from the separate interrogations being discriminated by wavelength. In which case, the interrogator could be configured to output interrogating radiation at a first wavelength with an optical power which is high enough to cause significant non-linear effects in the first length of optical fibre and also to output interrogating radiation at a second wavelength with an optical power which is low enough so as to not cause significant non-linear effects in the first length of optical fibre. The backscatter at the first wavelength could be used for POTDR measurement and the backscatter at the second wavelength could be used for coherent Rayleigh distributed fibre optic sensing, e.g. DAS.

In some embodiments however different optical paths could be selectively used to couple the interrogator to the sensing fibre in the different modes of operation.

Figure 3:
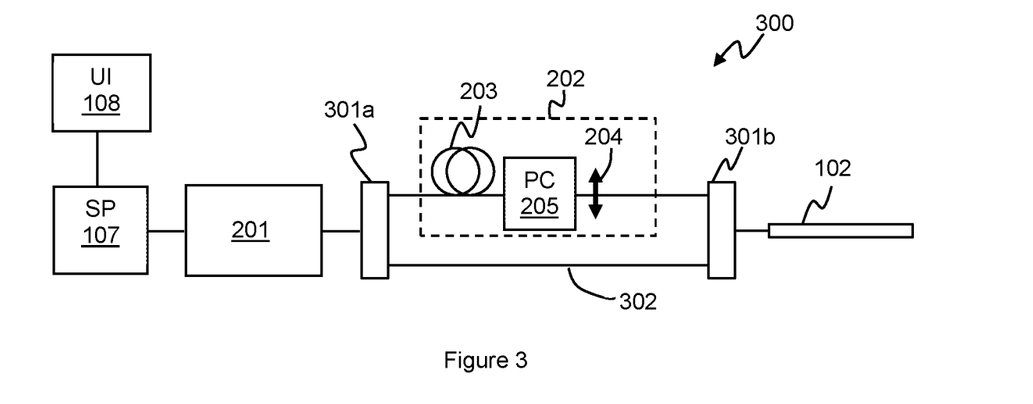
FIG. 3 illustrates another example of distributed fibre optic sensor system according to an embodiment with different optical paths for polarisation sensing and coherent sensing.

FIG. 3 illustrates another example of a sensing arrangement 300 operable to provide a polarisation sensing mode and a coherent Rayleigh sensing mode, in which similar components are identified by the same reference numerals.

FIG. 3 illustrates that a coherent interrogator 202 may be selectively optically coupled, via optical switches 301a and 301b, to the sensing fibre 102 via either a first optical path that included the optical system 202 or by a second optical path 302. The first optical path thus includes the first length 203 of optical fibre and polariser 204 and, if present, the polarisation controller 205.

In the polarisation mode of operation, the switches 301a and 301b may be controlled to select the first optical path and the interrogator 201 may generate interrogating radiation with an optical power that results in non-linear effects in the first length 203 of optical fibre to destroy the coherence of the interrogating radiation as described with respect to FIG. 2. In the polarisation sensing mode, the interrogator 201 is thus optically coupled to the sensing fibre so that interrogating radiation output from the interrogator is transmitted to the sensing fibre via the first optical system that comprises the first length of optical fibre upstream and the polariser.

In the coherent sensing mode, the switches 301a and 301b may be controlled to select the second optical path and the interrogator 201 may generate interrogating radiation with an optical power that is below a non-linear threshold. The second optical path bypasses at least the first length 203 of optical fibre, and conveniently may also bypass the polariser 204. The second optical path may comprise any suitable connection between the switches such a relatively short length of optical fibre, which may be of the length of a few metres or less. Using the second optical path for the coherent sensing mode avoids the first length 203 of optical fibre and thus avoids the propagation losses and delay associated with propagation through the first length of optical fibre and consequent impact on ping rate and SNR. The second optical path may also avoid any loss of backscatter, and hence a reduction in SNR, due to the polariser 204 in the return path.

The switches 301a and 302a may be electronically controlled together with the mode of operation of the interrogator 201.

In the embodiment of FIG. 3, where the first optical path is used for the polarisation sensing mode only, and the coherent sensing mode uses the second, different, optical path, the first length 203 of optical fibre may be selected so as to have beneficial characteristics for the polarisation sensing mode of operation. For instance, the first length 203 of optical fibre may be selected as one that exhibits a relatively high degree of non-linear effects. Certain types of optical fibres tend to exhibit relatively high non-linear effects and so a shorter length of such optical fibre could be used to destroy the coherence of the interrogating radiation. However, such fibres may have a greater attenuation and thus the selection of the optical fibre may be a trade-off between various factors, such as non-linearity and attenuation for example.

In the embodiments of FIGS. 2 and 3, in the polarisation sensing mode, any variation in polarisation in the backscatter from the sensing fibre is determined by passing the backscatter back through polariser 204 so that the intensity of the backscatter received at the interrogator varies with any polarisation modulation imparted by the sensing fibre 102. In some instances, however, the interrogator 201 may include some polarisation discrimination which may be utilized to determine the variation in backscatter from the sensing fibre.

For example, WO2020/016556 describes an interrogator that mixes the backscatter signal with a local oscillator prior to detection and the processes the signal at a defined carrier frequency. To avoid issues with polarisation fading, where if the backscatter has an orthogonal polarisation state to the local oscillator there would be no mixing and the carrier signal would be in a polarisation faded state, the interrogator is configured to mix the backscatter with the local oscillator at two different polarisation states.

Figure 4:
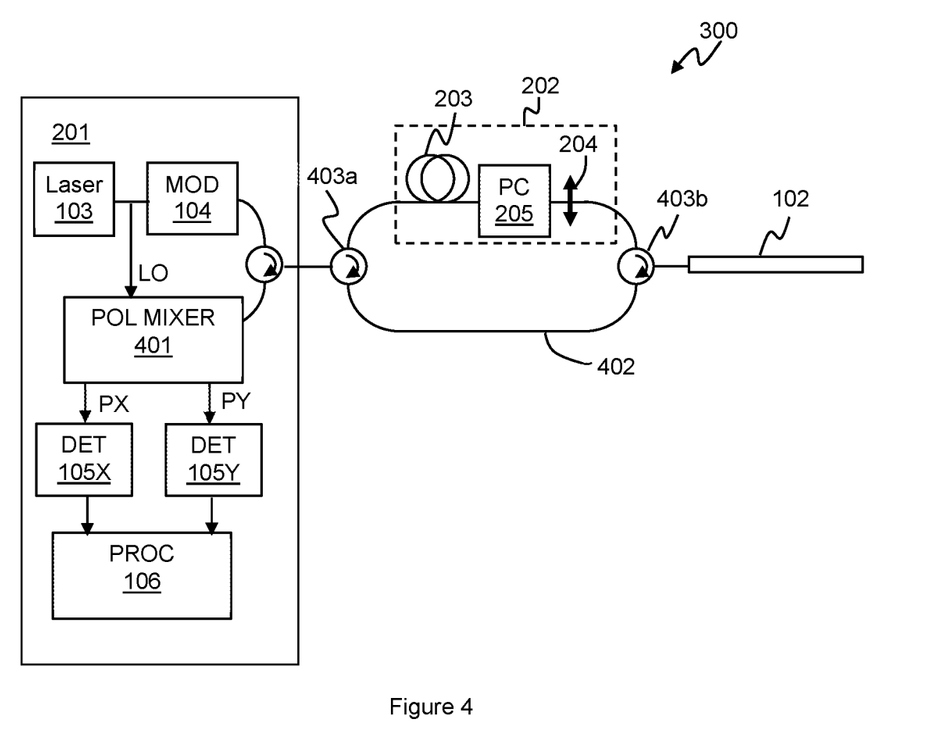
FIG. 4 illustrates an example of distributed fibre optic sensor system according to an embodiment with an interrogator having polarisation discrimination.

FIG. 4 thus illustrates that the interrogator 201 may comprise a polarisation mixer 401 for mixing the backscatter received at the interrogator 201 with a local oscillator LO derived from the laser 103. The polarisation mixer mixes the backscatter with the light in the local oscillator at a first polarisation state X to provide a first mixed signal PX and with the light in local oscillator at a second, orthogonal, polarisation state Y to provide a second mixed signal PY. The two different polarisation channels can be detected by separate detectors 105X and 105Y.

Such an interrogator can be used in a polarisation sensing mode as discussed above, and in which case the relative power of the carrier signal in the two different polarisation channels, as detected by detectors 105X and 105Y can be used to determine any variation in polarisation.

In this case, the backscatter radiation from the sensing fibre 102 may be returned to the interrogator 210 via a path 402 that bypass the polariser 204. In this case circulators 403a and 403b may be arranged so that outgoing interrogating radiation from the interrogator 201 is transmitted to the sensing fibre via optical system 202 that includes the first length 203 of optical fibre and the polariser 204, but is returned via the path 402 that bypasses the components of the optical system 202. For other cases in which polariser 204 is required on both outward and receive paths a similar arrangement of circulators could be used but with polariser 204 placed between circulator 403b and the test fibre 102.

For a system that does use not mixing with an LO signal a similar arrangement to FIG. 4 could be used in which component 401 would now be a polarisation splitter, which splits the returning light into the two components PX and PY and the ratio between them is used as a measure of the returning polarisation state. Component 401, and its two detectors 105X and 105Y, could be also be replaced by a more complex version of a polarisation analyser such as a Stokes analyser that is able to give a full determination of the polarisation state of the returning light Embodiments of the present disclosure thus enable an interrogator for coherent Rayleigh distributed fibre optic sensing, e.g. a DAS interrogator, to additionally or alternatively be used to perform POTDR type measurements.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A distributed fibre optic sensing apparatus, comprising:
an interrogator for repeatedly interrogating a sensing optical fibre with interrogating optical radiation and detecting radiation which is Rayleigh backscattered from within the sensing fibre,
wherein the sensing apparatus is operable in a first mode of operation, in which:
the interrogator is optically coupled to the sensing fibre so that interrogating radiation output from the interrogator is transmitted to the sensing fibre via a first optical system that comprises a first length of optical fibre upstream of a first polariser;
the interrogator is configured to output coherent optical radiation with an optical power such that the interrogating radiation experiences non-linear effects when propagating in the first length of optical fibre so as to reduce coherence of the interrogating radiation; and
the interrogator is configured to determine the extent of any variation in polarisation of the radiation which is Rayleigh backscattered from within the sensing fibre.

2. The distributed fibre optic sensing apparatus according to claim 1, wherein the optical power of the interrogating radiation in the first mode of operation and the length of the first length of optical fibre are configured so that propagation of the interrogating radiation through the first length of optical fibre in the first mode results in the interrogating radiation being incoherent.

3. The distributed fibre optic sensing apparatus according to claim 1, wherein the first optical system further comprises a polarisation controller.

4. The distributed fibre optic sensing apparatus according to claim 3, wherein the polarisation controller is configured to selectively control a polarisation modulation applied so as to maximize an amount of interrogating radiation that is transmitted via the polariser to the sensing optical fibre.

5. The distributed fibre optic sensing apparatus according to claim 4, wherein the interrogator is configured to monitor the amount of interrogating radiation that is transmitted via the polariser to the sensing optical fibre based on the backscatter intensity received from the start of the sensing fibre.

6. The distributed fibre optic sensing apparatus according to claim 1, wherein in the first mode of operation, the interrogator is optically coupled to the sensing fibre so that radiation which is Rayleigh backscattered from within the sensing fibre is returned to the interrogator via a return path polariser.

7. The distributed fibre optic sensing apparatus according to claim 6, wherein in the first mode of operation, the interrogator is optically coupled to the sensing fibre so that radiation which is Rayleigh backscattered from within the sensing fibre is returned to the interrogator via the first optical system and the first polariser is the return path polariser.

8. The distributed fibre optic sensing apparatus according to claim 6, wherein, in the first mode of operation, the interrogator is configured to determine the extent of any variation in polarisation of the radiation which is Rayleigh backscattered based on the intensity of backscattered radiation passed by the return path polariser.

9. The distributed fibre optic sensing apparatus according to claim 1, wherein the interrogator comprises a polarisation mixer for mixing the backscattered radiation with a local oscillator to form a mixed signal, the mixed signal being split into two different orthogonal polarisation channels and the interrogator is configured to determine the extent of any variation in polarisation of the radiation which is Rayleigh backscattered based on a comparison of the two polarisation channels.

10. The distributed fibre optic sensing apparatus according to claim 1, wherein, in the first mode of operation, the interrogator is optically coupled to the sensing fibre so that radiation which is Rayleigh backscattered from within the sensing fibre is returned to the interrogator via a return path that bypasses the first optical system.

11. The distributed fibre optic sensing apparatus according to claim 10, wherein the interrogator comprises a polarisation analyser and wherein, in the first mode of operation, the polarisation analyser is configured to analyse the backscattered radiation to determine a polarisation state of the backscattered radiation.

12. The distributed fibre optic sensing apparatus according to claim 1, wherein, in the first mode of operation, the distributed fibre optic sensing apparatus is operable to generate a measurement signal for each of a plurality of sensing portions of the sensing optical fibre indicative of dynamic changes in polarisation over time.

13. The distributed fibre optic sensing apparatus according to claim 1, wherein, in the first mode of operation, the distributed fibre optic sensing apparatus is operable to generate a static measurement signal for indicative of changes in polarisation over the length of the sensing fibre.

14. The distributed fibre optic sensing apparatus according to claim 1, wherein the sensing apparatus is further operable in a second mode of operation, wherein in the second mode of operation the interrogator is configured to output coherent optical radiation with an optical power that is below a threshold for significant non-linear effects in an optical fibre.

15. The distributed fibre optic sensing apparatus according to claim 14, wherein in the second mode of operation, the interrogator is optically coupled to the sensing fibre so that interrogating radiation output from the interrogator is transmitted to the sensing fibre via the first optical system.

16. The distributed fibre optic sensing apparatus according to claim 14, wherein in the second mode of operation, the interrogator is optically coupled to the sensing fibre so that interrogating radiation output from the interrogator is transmitted to the sensing fibre via an optical path that bypasses the first optical system.

17. The distributed fibre optic sensing apparatus according to claim 14, wherein the second mode of operation is a distributed acoustic sensing mode of operation.

18. A method of distributed fibre optic sensing apparatus, comprising:
  operating an interrogator to repeatedly interrogate a sensing optical fibre with interrogating optical radiation and detecting radiation which is Rayleigh backscattered from within the sensing fibre,
  wherein the method comprises selectively operating in a first mode of operation, in which:
    the interrogator is optically coupled to the sensing fibre so that interrogating radiation output from the interrogator is transmitted to the sensing fibre via a first optical system that comprises a first length of optical fibre upstream of a first polariser;
    the interrogator outputs coherent optical radiation with an optical power such that the interrogating radiation experiences non-linear effects when propagating in the first length of optical fibre so as to reduce coherence of the interrogating radiation; and
    determining the extent of any variation in polarisation of the radiation which is Rayleigh backscattered from within the sensing fibre.

19. The method of claim 18, wherein the method further comprises selectively operating in a second mode of operation in which the interrogator outputs coherent optical radiation with an optical power that is below a threshold for significant non-linear effects in an optical fibre.

20. A distributed fibre optic sensing apparatus, comprising:
  a coherent Rayleigh interrogator,
  wherein the sensing apparatus is operable in a first mode of operation, in which interrogating radiation output from the interrogator is transmitted to a sensing fibre via a first optical system that comprises a first length of optical fibre upstream of a first polariser and the interrogator outputs coherent interrogating radiation output with an optical power such that the interrogating radiation experiences non-linear effects when propagating in the first length of optical fibre.

* * * * *